United States Patent
Tadauchi et al.

[11] Patent Number: 6,123,248
[45] Date of Patent: Sep. 26, 2000

[54] SOLDERING METHOD AND SOLDERING APPARATUS

[75] Inventors: Masahiro Tadauchi, Tokyo; Makoto Gonda, Kanagawa; Yoshiyuki Goto, Tokyo; Tomiaki Furuya, Kanagawa; Kouichi Teshima, Tokyo; Izuru Komatsu; Takeshi Gotanda, both of Kanagawa, all of Japan

[73] Assignees: Kabushiki Kaisha Toshiba, Kawasaki; Kuroda Denki Kabushiki Kaisha, Tokyo, both of Japan

[21] Appl. No.: 09/099,522

[22] Filed: Jun. 18, 1998

[30] Foreign Application Priority Data

Jun. 18, 1997 [JP] Japan ................................. 9-161644

[51] Int. Cl.[7] .......................... B23K 1/06; B23K 20/10; B23K 31/02; B23K 35/38
[52] U.S. Cl. .................... 228/111.5; 228/219; 228/262
[58] Field of Search .................................. 228/111.5, 214, 228/218, 219, 225, 226, 256, 262

[56] References Cited

U.S. PATENT DOCUMENTS

| | | | |
|---|---|---|---|
| 3,994,430 | 11/1976 | Cusano et al. | 228/112 |
| 4,610,391 | 9/1986 | Nowotarski | 228/219 |
| 4,868,034 | 9/1989 | Steinberg | 428/403 |
| 5,368,814 | 11/1994 | Gonya et al. | 420/587 |
| 5,427,303 | 6/1995 | Nowotarski | 228/180.22 |
| 5,451,247 | 9/1995 | Gross et al. | 75/699 |
| 5,569,433 | 10/1996 | Chen et al. | 420/557 |
| 5,667,849 | 9/1997 | Carey, II et al. | 427/431 |
| 5,695,822 | 12/1997 | Carey, II et al. | 427/329 |
| 5,718,868 | 2/1998 | Ninomiya et al. | 420/560 |
| 5,730,932 | 3/1998 | Sarkhel et al. | 420/562 |
| 5,759,379 | 6/1998 | Cavallotti et al. | 205/177 |
| 5,783,059 | 7/1998 | Cavallotti et al. | 205/226 |
| 5,990,564 | 11/1999 | Degani et al. | 257/778 |

*Primary Examiner*—Patrick Ryan
*Assistant Examiner*—Kiley Stoner
*Attorney, Agent, or Firm*—Foley & Lardner

[57] ABSTRACT

Disclosed is a method and an apparatus for soldering a base material. A binary solder essentially consisting of tin and a metal which can form an eutectic alloy with tin and which is exclusive of lead is prepared. The content of other metallic components is 0.1% by weight or less and the content of oxygen is 100 ppm or less. The binary solder is melted in a non-oxidizing environment and dispensed to the base material in an atmosphere in which the oxygen content is 2,000 ppm or less, to solder the base material with the binary solder. The soldering apparatus comprises an oscillator for supplying oscillatory wave energy having frequency of 15 KHz to 1 MHz to the base material. The soldering apparatus can also be realized in the form of a soldering nozzle or a soldering iron.

9 Claims, 9 Drawing Sheets

SOLDERING METHOD AND SOLDERING APPARATUS

BACKGROUND OF THE INVENTION

1. Field of the Invention

The present invention relates to a soldering method and a soldering apparatus which are used for bonding parts or equipment components. In particular, the present invention relates to a soldering method and a soldering apparatus which are applicable to manufacture of circuit boards which mount an electronic part, printed circuits and the like, and which are suitable for soldering treatment with use of a solder which contains no lead.

2. Related Art

Soldering is an art for bonding objects to each other by using a substance having a low melting point, and it has been used since old times. It is generally said that the origin of the soldering can be traced up to ancient Mesopotamian civilization. In current industries, soldering is widely used in bonding electronic devices, for example, bonding such electronic devices as semiconductor, microprocessor, memory and resistor to a substrate. Its advantage is not only to fix a part to the substrate, but also to form electrical connection by electric conductivity of the metal contained in the solder. This point is different from organic series adhesive agents.

The solder which is generally used is eutectic solder composed of tin and lead, having a eutectic point of 183° C. This is used for bonding sheet materials of copper or the like. It is characterized by the eutectic point which is not only lower than the melting point of metallic base material to be soldered, but also lower than a temperature in which gasification of thermosetting resin begins. Further, it has been known that the tin component of the eutectic solder forms a particular intermetallic compound on an interface with a copper plate, thereby intensifying bonding strength between the solder and copper. In addition to the eutectic solder composed of tin and lead having such a characteristic, solder composed of tin and zinc, solder composed of silver and tin, etc. have been used on trial. However, their wettabilities are poor, thereby providing a poor connectability. Thus they have not been conventionally used in actual fields.

As described above, bonding by soldering is still important in manufacture of electronic devices. In today's world in which personal electronic devices such as a personal computer, a cellular phone, a pager and the like have been spreading quickly, the importance of solder in electronic device mounting technology has been intensified.

Spreading of electronic devices contributes to enrichment of people's lives. However, on the contrary, if a large amount of electronic devices disused are scrapped, there is a fear that wasted electronic devices may pollute the environment. Therefore, recycling of disused articles and elimination of harmful substances from the materials to be used for manufacture of articles have been advocated. Especially, the elimination of harmful substances is desired in view of prevention of environmental polution.

From such a condition, bonding skill by using solder containing no lead has been demanded. However, solder in which lead is substituted by other metal or solder containing a combination of other metals cannot be handled at such a low temperature that bad influence upon the base metal by high temperatures can be avoided, and the wettability is so poor that the solder is not fixed to the base metal satisfactorily. Thus, such a solder can be applied to neither fine soldering treatment such as mounting in semiconductor devices not ordinary bonding by solder. Particularly, solder with tin and zinc has too many problems to be solved, therefore, it has been considered impossible to use it for actual application in electronic mounting (ref. Tadashi TAKEMOTO et al., "Environmental Conscious Lead-free Solder Alloys compatible with Fine Pitch Soldering", Proceedings of The Third International Conference on Ecomaterials (Sep. 10–12, 1997, Tsukuba, Japan)).

To enable use of solder without lead in fine soldering works such as thick film formation, conductor circuit formation and semiconductor mounting, a screen printing method using solder paste in which solder powder and flux are mixed has been proposed. The flux used in solder paste is generally classified to organic compound, inorganic compound and resin. In the case when organic compound or resin is used, halogen salt, organic acid salt and the like of organic acid and amino group are frequently added as active ingredient. In the case of inorganic compound, ammonium halide, zinc halide, tin halide, phosphoric acid, hydroacid halide or the like are often added. Since these additives corrode metals, inspection for corrosion due to flux residue after reflow of solder paste is necessary. Moreover, organic substance evaporating when paste is heated to remove flux, must be treated.

SUMMARY OF THE INVENTION

Accordingly, an object of the present invention is to provide a soldering method and a soldering apparatus for manufacturing a product with use of a solder alloy which contains metals applicable for wide fields, instead of lead which may cause environmental pollution when a product using such a solder is wasted, and which is suitable for mounting electronic parts on a substrate.

A method of soldering a base material, according to the present invention, comprises the steps of: preparing a binary solder essentially consisting of tin and a metal component which can form an eutectic alloy with tin and which is exclusive of lead, such that the content of other metallic components than said metal component and tin is 0.1% by weight or less and that the content of oxygen is 100 ppm or less; melting the binary solder in a non-oxidizing environment to produce molten binary solder; and dispensing the molten binary solder to the base material in an atmosphere in which the oxygen content is 2,000 ppm or less, to solder the base material with the binary solder.

The metal component of the binary solder is selected from the group consisting of zinc, silver, bismuth, indium and copper, and the melting step comprises a heating step for heating the binary solder at a temperature which is on or above an eutectic point of the binary solder.

The dispensing step comprises: putting the molten binary solder into contact with the base material while oscillatory wave energy at a frequency of 15 KHz to 1 MHz is provided to the base material.

An apparatus of soldering a base material, according to the present invention, comprises: a preparation unit for preparing a molten binary solder essentially consisting of tin and a metal component which can form an eutectic alloy with tin such that the content of other metallic components than said metal component and tin is 0.1% by weight or less; an anti-oxidizing unit for preventing oxidization of the molten binary solder so that the content of oxygen in the molten binary solder does not exceed 100 ppm; a solder dispensing unit for dispensing the molten binary solder by putting the base material into contact with the molten binary solder in an atmosphere in which the oxygen content is 2,000 ppm or less; and an oscillator for supplying oscillatory wave energy having frequency of 15 KHz to 1 MHz to the base material which contacts with the molten binary solder.

The solder dispensing unit comprises a pump for making a flow of the molten binary solder in the melting bath and a transporting unit for transporting the base material onto the flow of the molten binary solder, and the oscillator supplies the oscillatory wave energy to the circulation flow of the molten binary solder toward the base material.

According to another aspect, an apparatus of soldering a base material of the present invention, comprises: a nozzle unit with a melting device for melting a binary solder essentially consisting of tin and a metal component which can form an eutectic alloy with tin such that the content of other metallic components than said metal component and tin is 0.1% by weight or less to produce molten binary solder, while the binary solder is shielded from the atmosphere, and for dispensing the molten binary solder to the base material; and a gas supply unit for supplying a substantially non-oxidizing gas around the molten binary solder dispensed by the nozzle unit.

The nozzle unit comprises a droplet maker for making droplets of the molten binary solder by means of oscillatory wave energy, so that the nozzle unit dispenses the molten binary solder in the form of droplets.

According to still another aspect, an apparatus of soldering a base material of the present invention, comprises: a soldering iron for melting a solder by heating the soldering iron in contact with the solder so that the molten solder is disposed on the base material; a gas supplying unit for supplying a non-oxidizing gas around the soldering iron to prevent oxidization of the molten solder and the base material; and an oscillator for supplying oscillatory wave energy to the base material and the molten solder.

According to still another aspect, an apparatus of soldering a base material of the present invention, comprises: a plurality of melting baths for separately melting said plurality of solders to separately receive said plurality of molten solders; a gas supply unit for supplying a non-oxidizing gas atmosphere to said plurality of melting baths to prevent oxidization of said plurality of molten solders; a transporting unit for transporting the base material to one of said plurality of melting bathes to dip the base material in the molten solder received in said one of the melting baths; and an oscillator for supplying oscillatory wave energy to the base material dipped in the molten solder received in said one of the melting baths.

In accordance with the above construction, it is possible to reduce the soldering temperature at which the base material is contacted with the molten solder or the temperature at which the solder is heated and molten, down to the vicinity of the liquidus line temperature of the solder, by decreasing the content of oxygen which is contained in the solder and by decreasing the contents of metal components other than the solder-alloy-forming components. When the molten solder and the base materials are contacted with each other in a non-oxidizing environment, wettability of the molten solder is suitably maintained. By supplying oscillatory wave energy, surface conditions of the base material is improved, thereby obtaining improved contacting property and high wettability between the molten solder and the surface of the base material. This enables to carry out fine soldering with a solder in which no lead is used and common metals are used. Accordingly, environmental pollution by the lead contained in the waste materials, and it is also possible to perform soldering without use of flux in manufacturing process of products such as semiconductor devices.

BRIEF DESCRIPTION OF THE DRAWINGS

The features and advantages of the soldering method and the soldering apparatus according to the present invention will be more clearly understood from the following description of the invention conjunction with the accompanying drawings in which identical reference letters designate the same or similar elements or cases throughout the figures and in which.

DETAILED DESCRIPTION OF THE PREFERRED EMBODIMENTS

Figure 1:
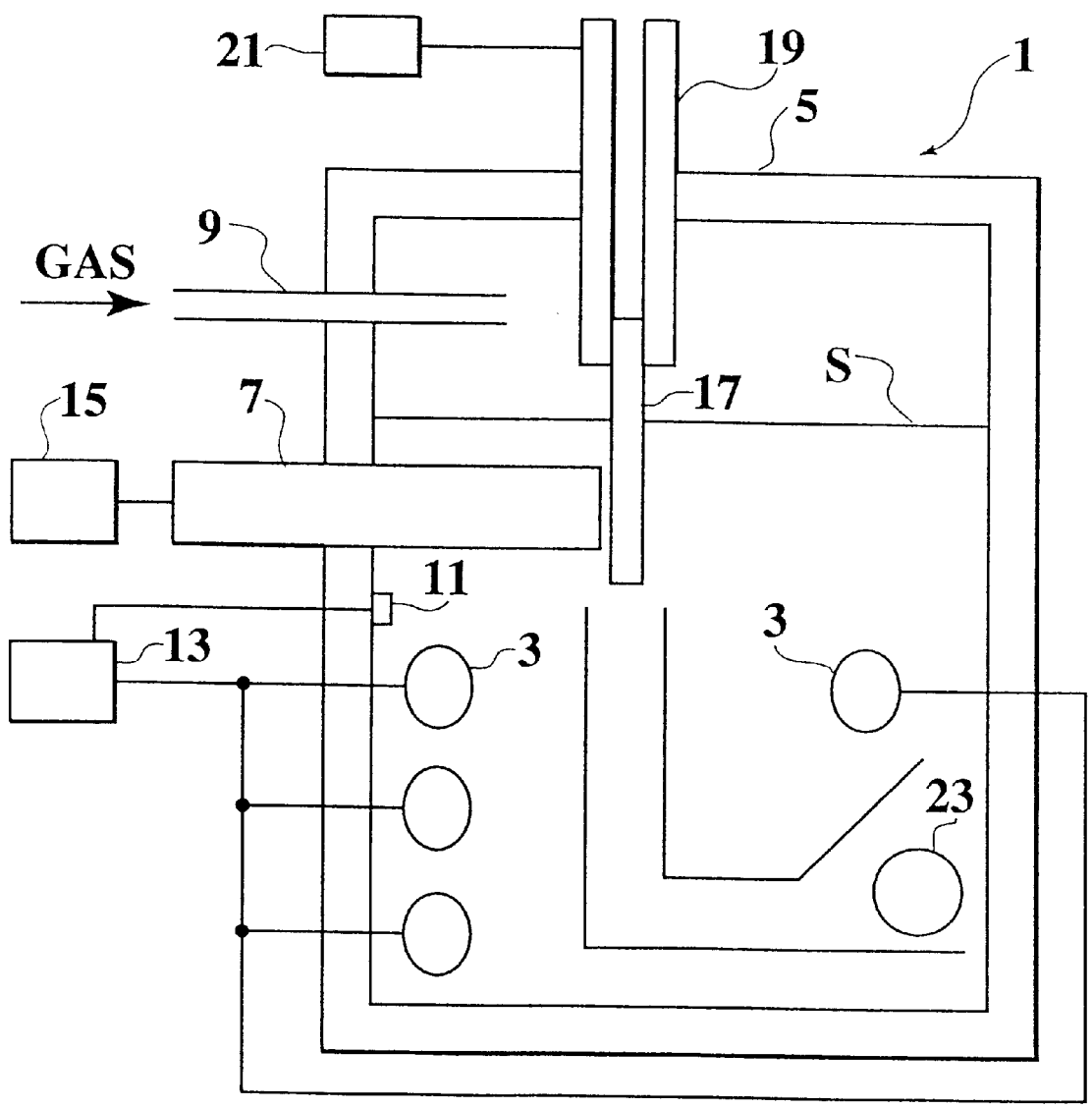
FIG. 1 is a schematic structure diagram showing the first embodiment of an apparatus for practicing the soldering method according to the present invention.

There are various kinds of solders in accordance with the kinds of the component metals to be used and the combination thereof, and the solders can be classified into a soft solder type and a hard solder type. The common solder which is generally utilized is a soft solder which is composed of a eutectic composition of tin and lead. This is often called a solder according to a narrow definition. However, it is noted that a solder in the present invention means a bonding material containing metal and having a low melting point. It is usable for bonding of various metallic members which includes a copper plate material to begin with.

In theory, the temperature of the molten solder in which the base material is to be dipped to perform the soldering (this temperature will be called soldering temperature below) may be set on the liquidus line temperature or more. However, the practical standard soldering temperature is conventionally about 50° C. above the liquidus line temperature, and soldering below this standard soldering temperature has been considered as being difficult. According to this standard, the soldering temperature of Sn—9Zn eutectic solder must be in the vicinity of 25° C. and that of Sn—3.5Ag eutectic solder be about 270° C. Since these temperatures are higher than the standard soldering temperature of tin-lead solder, the base materials to be soldered are easily and badly affected by such high temperatures during the soldering treatment. These temperatures are too high, in particular, to use in bonding of electronic parts such as a print circuit substrate and the like. The conventional proposal for solving this problem was to add of the third component. However, this measure causes another problem which is practically disadvantageous and it is still difficult to fall the soldering temperature down to a sufficiently low temperature. This state is one of the reasons that soldering with a solder containing no lead has been recognized as being difficult to realize.

Moreover, since the lead is a component which imparts wettability to the solder, solders containing no lead, such as a tin-zinc solder, a silver-tin solder and the like are normally deficient in wettability and their adhesion to the base material deteriorates. Therefore, it has been considered such solders are not suitable for practical use. In particular, wettability of the tin-zinc solder is so low that practical soldering seems difficult with it. As described above, low wettability is another reason for preventing realization of a solder containing no lead.

On observing the soldering, there can be seen a phenomenon that a very thin film is formed on the surface of the molten solder and it tends to hinder the base material from contacting with the molten solder. This thin film is made of metal oxide. In particular, if the solder is a tin-lead solder, the metal oxide film formed thereon is mainly composed of lead oxide, and that of the tin-zinc solder case is mainly zinc oxide. A film of lead oxide has a strength which is relatively low and is easily broken when the base material is dipped into the molten solder, so that the inner molten solder contacts with the base material to realize the soldering. In contrast, in the case of a zinc-containing solder, a zinc oxide film easily grows up to form a strong film, which stubbornly hinders the molten solder from contacting the base material. In view of the above, it is necessary for improvement of wettability of the solder, firstly, to remove the contact hindrance made by the film on the surface of the molten solder. For this purpose, the molten solder is necessarily placed in a non-oxidizing environment until it contacts with the base material in order to prevent oxygen from contacting the solder and forming a metal oxide film.

There is another factor which deteriorates wettability of the solder to the base material. That is a membrane formed on the surface of the base material. Specifically, in a case of a base material made of copper, a copper oxide membrane is formed on the surface of the base material by the oxygen contained in the atmosphere, and it causes deterioration of wettability and bonding strength of the solder. Accordingly, in order to improve the wettability of the solder, it is necessary to clean the surface of the base material. For achieving this purpose, it is quite effective to provide oscillatory wave energy such as ultrasonic wave energy, high-frequency wave energy, arc wave energy and the like. The surface membrane of the base material is broken or dispersed by the oscillatory wave energy, and the base material is promoted to directly contact the molten solder and make a strong solder bonding. Moreover, in a case where a membrane of oil, fat or the like covers the surface of the base material to inhibit wetting of the solder, the oscillatory wave energy also effectively works to clean the surface of the base material to remove such a cover.

As it is clear from the above description, if the base material contacts the molten solder in a non-oxidizing environment while oscillatory wave energy is supplied to the base material, wettability of the solder is remarkably improved and soldering with a binary solder containing no lead can be achieved. In addition, the yield percentage of complete bonds made by soldering is markedly improved by selecting suitable conditions. "Non-oxidizing environment" means environment in which the metal of the molten solder does not substantially form oxide by an oxidizing substance such as oxygen and the like, and this can be given, for example, by supplying an inactive or inert gas to the atmosphere, or by discharging air with a pump, etc. The degree of the non-oxidizing property which is required to the environment for improvement of wettability of the solder is somewhat different according to easiness to be oxidized of the used solder. In a case of a tin-zinc solder, which is called one of the solders having the lowest wettability in the solders with no lead, improvement of wettability by preventing production of metal oxide can be seen when the oxygen content of the atmosphere is about 10,000 ppm or less, as shown in Table 1. In view of the above, the oxygen content of the non-oxidizing environment or atmosphere for soldering is preferably about 10,000 ppm or less, and desirably about 500 ppm or less.

TABLE 1

Wettability of Tin-Zinc Solder to Copper Plate

| Oxygen Content of Atmospher | Zinc Content of Tin-Zinc solder (wt %) | | | |
|---|---|---|---|---|
| | 3 | 9 | 15 | 50 |
| 50 | A | A | A | A |
| 150 | A | A | A | A |
| 500 | A | A | A | A |
| 1,000 | A | A | A | B |
| 2,000 | A | A | A | C |
| 10,000 | B | B | B | C |
| Air | C | C | C | C |

Estimation
A: good wettability
B: insufficiently exhibited
C: almost no wettability
Conditions oscillatory wave frequency: 19.5 kHz
base material: copper
soldering temperature: liquidus line temperature + 10° C.

Since zinc is easily oxidized, a tin-zinc solder containing a large amount of zinc tends to be easily oxidized by the atmospheric air and easily causes deterioration of fluidability and wettability due to production of metal oxide. From this point of view, a solder containing less zinc is preferable. On the other hand, viscosity of the molten solder at the same temperature is minimized in the vicinity of the eutectic composition, i.e. at the zinc content of about 9 wt %, and fluidability and wettability are thus raised. From this point, a solder of the eutectic composition is advantageous. In addition, since a solder having a composition in the vicinity of the eutectic point has a low melting point, use of such a solder enables to set the soldering temperature low. According to this fall of the temperature, gas absorption of the molten solder which depends on the temperature can be reduced. Therefore, it is easier to inhibit oxidization of the solder with absorption of the atmospheric air. The inclination shown in Table 1 is considered as being the result from the above-described factors. In accordance with the above, a tin-zinc solder having a composition in the vicinity of the eutectic point or containing about 3 to 15 wt % zinc is suitable, and a tin-zinc solder having the eutectic composiiton (91Sn—9Zn) is particularly excellent. Wettability of the tin-zinc solder is especially low in comparison with other various binary tin solders which possibly form an eutectic alloy, and other binary tin solders also show the same inclination as shown in Table 1. Namely, any binary tin solder that the oxygen content is 2,000 ppm or less exhibits good wettability. The composition range that the solder exhibits good wettability is about 0.1 to 28 wt % silver in the case of a tin-silver solder, about 21 to 99.9 wt % bismuth in a tin-bismuth solder, about 0.1 to 7.6 wt % copper in a tin-copper solder and about 0.1 to 75 wt % indium in a tin-indium solder, respectively, and a solder having an eutectic composition in each kind of solder is especially prominent.

According to the present invention, the content of oxygen in solder is reduced by improving preparation of raw material solder. In this connection, it is also possible to reduce the content of other components than tin and metals which are capable of forming eutectic alloy with tin. As a result, not only a high wettability can be obtained, but also the melting temperature of the solder drops, so that in a case of tin-zinc eutectic solder, soldering is possible at a melting temperature of about 210° C. which is near the eutectic temperature. Therefore, addition of other components such as bismuth or the like for lowering the melting temperature is not necessary, and this is used as a two-component solder or a binary solder for soldering. This composition has no fear of generating a trinary eutectic matter and has an advantage that performance of solder can be stabilized easily. As a result, a change of reflow temperature of solder material can be suppressed. Moreover, adaptation to recycle is also easy. In other words, taking into account an influence upon solder characteristic, it is preferable not to add other components than tin and zinc or the like forming eutectic with tin. Therefore, suitable for use for low temperature soldering is a binary solder in which concentration of oxygen is less than 100 ppm, preferably less than 10 ppm and foreign matter exceeding its inevitable amount or other metallic components are not contained, that is, the content of foreign matter and other metallic component is less than 0.1% by weight. Moreover, by using such solder in soldering under the above-described non-oxidizing environment, the soldering temperature can be maintained low.

Preparation of tin-zinc alloy solder in which the content of oxygen is reduced can be achieved by using phosphorus, magnesium or the like which have a low melting point and are likely to react with oxygen as an oxygen scavenger or deoxidizer. In detail, a raw zinc material is added to a raw tin material depending on the composition ration of an aimed solder alloy and melted by heating. Then phosphorus of 0.01–0.1% by weight ratio is added to the melted material. As a result, oxygen in the melted material is bonded with phosphorus so that it floats on the surface of the melted material as slag. Then this slag is removed and the melted material is poured into a mold and left as it hardens. As a result, solid solder in which the oxygen content is reduced to 30 ppm or less is obtained. By this treatment, other components or impurities can also be reduced.

As an embodiment of a means for making molten solder into contact with base material under non-oxidizing environment, a melting bath for dip provided with an inactive gas supply unit can be mentioned. In this melting bath, solder is melted under inactive gas atmosphere and a base material is dipped in molten solder. It is also possible to absorb and remove oxygen from that atmosphere by using a column, filter or the like filled with oxygen absorption agent such as oxidizable substance and separate the molten metal from the atmosphere using a separation sheet. Alternatively, it is also possible, by providing the molten solder which is melted under the non-oxidizing environment directly to the base material through a nozzle or the like without contacting the atmosphere, to easily make the molten solder into contact with the base metal under the non-oxidizing environment. In a case of heating and melting solder using a batch type melting bath for dip, the non-oxidizing environment can be easily produced and the economic efficiency is improved by reducing a ratio of the volume of the atmosphere over the solder relative to the volume of the solder in the melting bath by adjusting the amount of the solder to be charged into the bath or devising the shape of the bath.

Because solder is likely to absorb oxygen particularly in the molten state so that it is quickly oxidized, it is necessary to carry out the procedure from melting the solder to making the solder into contact with the base material under the non-oxidizing environment.

As for cleaning the surface of the base material by oscillatory wave energy, it is most effective to apply the oscillatory wave energy directly to a soldering position of the base material or its surrounding area. The oscillatory wave energy to be applied is appropriately selectable depending on application condition. Elastic wave in the vicinity of ultrasonic wave of 15 kHz to 1 MHz is easy to handle and further provides an equal contact surface. The efficiency for crushing the oxide membrane on the surface of the base material changes depending on a magnitude of the oscillatory wave energy applied to the membrane. Thus, that efficiency is determined depending on a distance between the oscillatory wave energy source (oscillator) and the membrane, a strength of the oscillatory wave energy and a medium to which the vibration is applied.

When soldering is carried out by supplying the oscillatory wave energy to the solder and the base material under the non-oxidizing environment, the wettability of the solder with respect to the base material is surprisingly improved. If only one of the non-oxidizing environment and oscillatory wave energy is utilized, a preferable soldering is not achieved and a satisfactory yield of the soldered product is not attained.

If a slight amount of oxygen is contained in the atmosphere or the solder, it is possible to prevent the formation or growth of metallic oxide film in the molten solder by the above mentioned oscillatory wave energy, so that a contact between the molten solder and base material is facilitated.

Moreover, the oscillatory wave energy acts to improve not only the wettability but also separation of solder. As a result, according to the present invention, the solder is provided with a very high wettability and excellent separation. Thus, by using a solder not containing lead, not only soldering of a wide plane but also soldering of fine belt-like plane and complicated shape can be suitably attained. Therefore, the soldering apparatus of the present invention can be applied to soldering of plural wires formed on an insulating substrate made of resin or ceramic such as a package board or a printed circuit board, in particular, fine accuracy soldering for high density wiring.

In the package board or printed circuit board of the semiconductor device, wiring is formed of conductor such as tungsten, copper or the like on an insulating substrate made of heat resistant resin such as glass epoxy resin or ceramic such as aluminum nitride. To connect this wire to an input/output terminal such as a terminal of a semiconductor element, solder is placed on the wire and reflowed to form a connection with the semiconductor device. With intensified function of the semiconductor device and miniaturization thereof, wiring of the substrate has become high density. To solder a fine width wire at a reduced pitch, the wettability and separation of the solder are required. In this regard, the soldering method and soldering apparatus of the present invention are capable of meeting these requirements. By soldering under the non-oxidizing environment with supply of vibration energy to the solder and base material (wire), even if solder not containing lead is used, fine accuracy soldering on wire of several tens to several hundreds gm in line width and line interval can be achieved and there does not occur a case in which an interval between the lines is filled with solder or a bridge is formed therebetween.

Soldering on a wiring of a substrate can be achieved according to the following procedure. First, as a solder material, for example, tin-zic solder having oxygen content of less than 0.01 wt % is used and the solder is melted at temperatures over the melting temperature of the solder, preferably 10 to 50° C. higher than the liquidus temperature, for example, 210 to 230° C. Next, the wired substrate is dipped into the melted solder and oscillatory wave energy is applied to the melted solder. For this purpose, elastic wave in the vicinity of ultrasonic wave, for example, near 18 kHz is used. The dipping time of the wiring substrate is preferably less than 10 seconds, more preferably 0.01 to 5 seconds. To avoid an unnecessary reaction, the dipping time is preferred to be as short as possible. After dipping, the wiring substrate is pulled out from the molten solder and cooled. As a result, a substrate in which solder is attached to only the wires is obtained. A direction of pulling out the wiring substrate is preferred to be parallel to the longitudinal direction of the wire on the wiring substrate. If the pulling direction is perpendicular to the length direction of the wire, solder separation becomes poorer than when it is parallel thereto. If the direction of wire arrangement on the substrate is not single, it is preferred that the direction of pulling the wiring substrate is not perpendicular to the longitudinal direction of the wire.

As understood from the above description, the soldering method of the present invention intends to improve the wettability of solder by adjusting a contact face between the molten solder and base metal to an appropriate condition. Thus, the present invention can be applied to not only soldering with solder not containing lead such as tin-zinc solder, tin-silver solder, tin-bismuth solder, tin-silver-copper solder, tin-bismuth-silver-copper solder and the like, but also soldering with solder containing lead, solder made of single metal and solder containing other substance than metal. Further, the present invention can be applied to plating by using such a solder as a plating material, assembly work using a joining material and the like.

As for the base material, the present invention can be applied to the base material of not only single-metal material such as copper, silver, gold, nickel, aluminum, silicon, stainless and the like, but also alloy material and composite metal and the like. Further, the present invention can be applied to soldering of wires on the substrate made of glass, ceramics, resin and composite material of these substances. Moreover, by application and modification of the present invention, it is possible to apply soldering directly onto ceramics or the like.

FIG. 1 shows an embodiment of the soldering apparatus according to the present invention. This soldering apparatus 1 comprises a melting bath 5 having a heater 3 for melting solder by heat, an oscillator 7 for oscillating elastic waves such as ultrasonic wave which are transmitted through solder S melted in the melting bath 5, and a gas injection device 9 for injecting inactive gas into the melting bath 5 to prevent oxidation of the melted solder S.

After charged to the melting bath 5, the solder S melted by the heater 3 is maintained at a constant temperature by a temperature control device 13 having a sensor 11 for detecting the temperature of the solder. The temperature of the solder S is set to be slightly higher than the melting point of the solder. The wavelength of the elastic wave transmitted by the oscillator 7 is controlled appropriately by an adjusting device 15. A base material 17 to be soldered (or substrate having wiring) is held by a movable holder 19. In a sequential controller 21, a time for dipping the base material 17 in solder S, a speed for charging the base material 17 in the solder S and a speed for pulling the base material 17 out of the solder S are preliminarily set. The movable holder 19 is moved according to this setting. The solder S is circulated by a circulation pump 23 provided in the melting bath 5.

Figure 2:
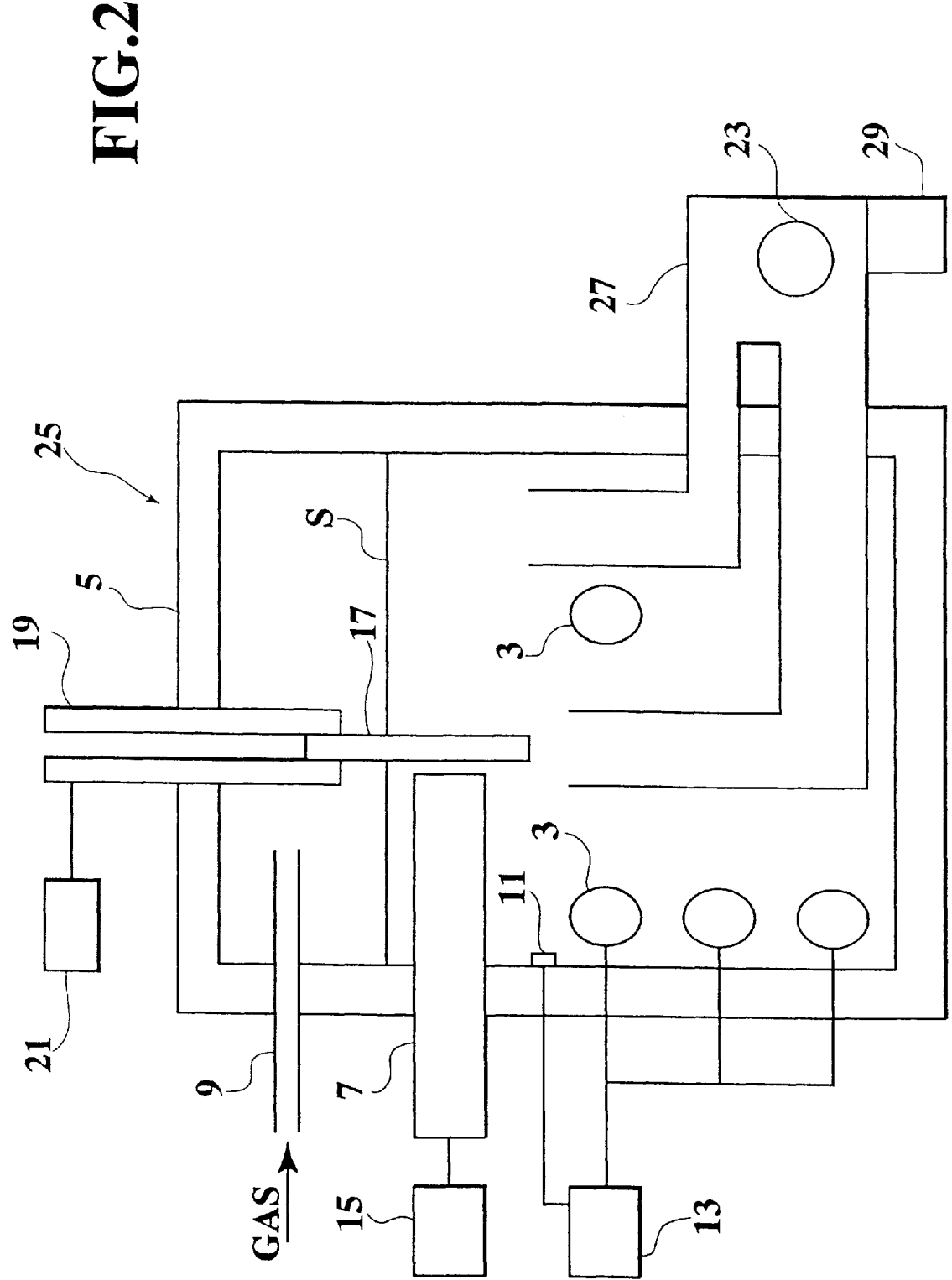
FIG. 2 is a schematic structure diagram showing the second embodiment of the apparatus for practicing the soldering method according to the present invention;.

FIG. 2 shows another embodiment of the soldering apparatus. This soldering apparatus 25 contains a conduit pipe 27 extending from the interior of the melting bath 5 to the outside and the circulation pump 23 is provided in the conduit pipe 27. Thus, the molten solder S in the melting bath 5 is circulated and reaches the outside of the melting bath 5. The molten solder S in the conduit pipe 27 can be picked up through an outlet port 29. Because the other portions of this apparatus have the same function as the portions having the same reference numeral in FIG. 1, a description thereof is omitted.

Figure 3:
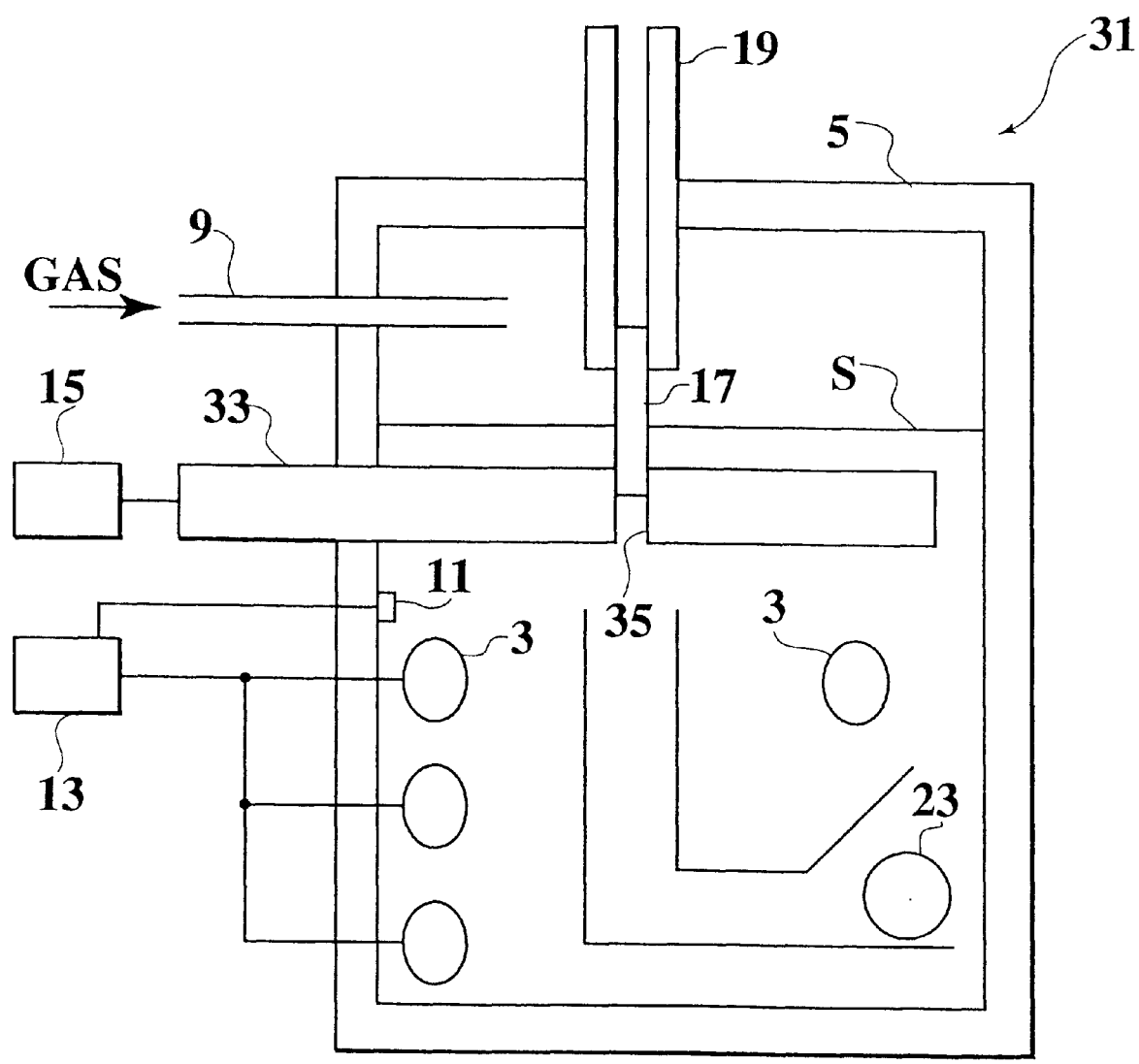
FIG. 3 is a schematic structure diagram showing the third embodiment of the apparatus for practicing the soldering method according to the present invention.

FIG. 3 shows still another embodiment of the soldering apparatus. An oscillator 33 of this soldering apparatus 31 is so constructed as to apply elastic wave directly to the base material (or a substrate having wiring and so on) 17. That is, the oscillator 33 is provided with a gap 35 in which the base material 17 can be inserted. By inserting the base material 17 into the gap 35, the elastic wave is transmitted directly to the base material 17 so that crushing and separation of oxide membrane on the surface of the base material 17 are accelerated. Because the other portions have the same function as the portions having the same reference numeral in FIG. 1, a description thereof is omitted. It is permissible to so construct that a width of the gap 35 is larger than that of the base material such that the oscillator 33 makes contact with a single face of the base material and the vibration energy is supplied alternately to respective surfaces of the base material.

Figure 4:
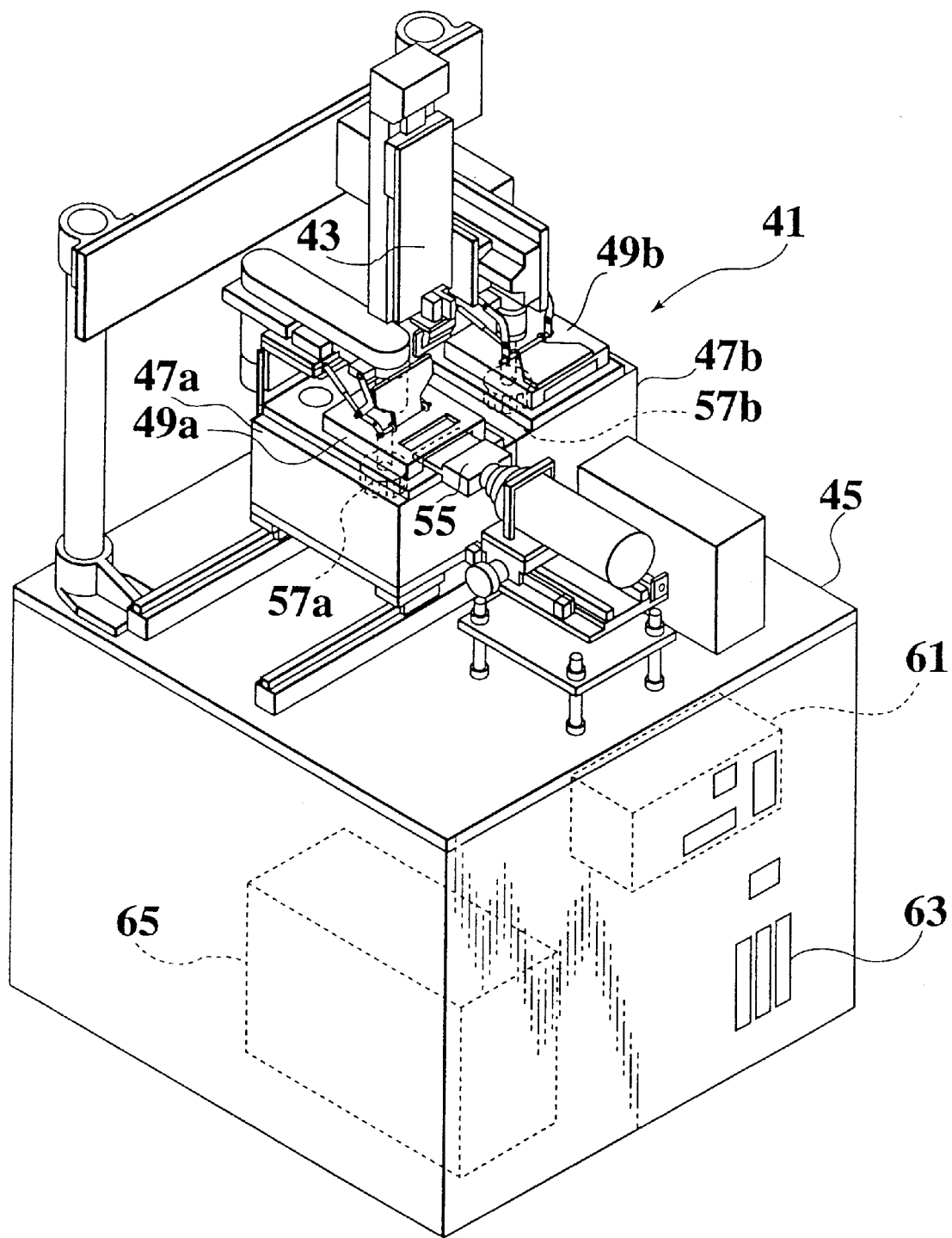
FIG. 4 is a schematic structure diagram showing the fourth embodiment of the apparatus for practicing the soldering method according to the present invention.
Figure 5:
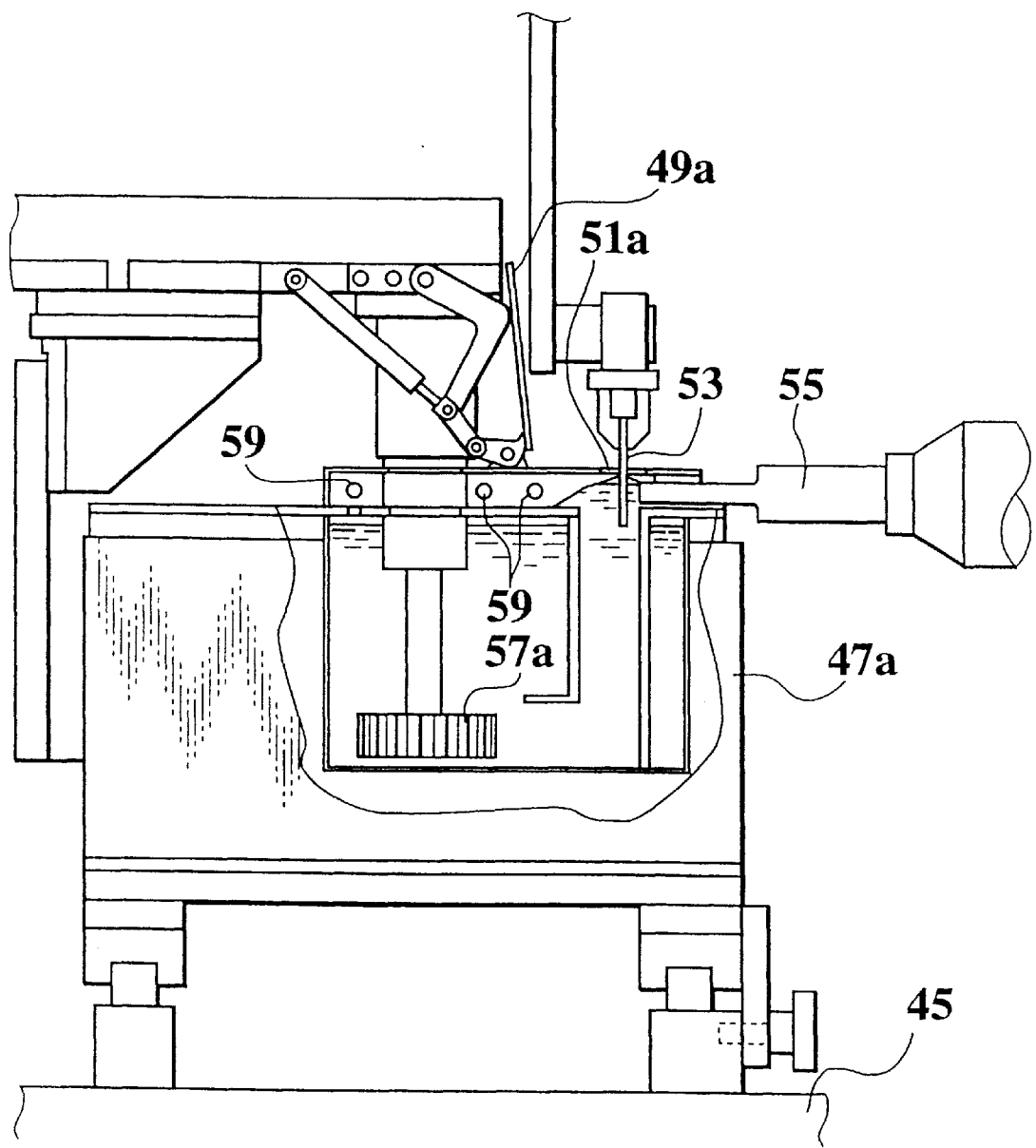
FIG. 5 is an enlarged view showing the essential part of the apparatus in FIG. 4.

FIGS. 4 and 5 show an example of a soldering apparatus having two melting baths enabling a replacement of solder material without interrupting soldering work. This soldering apparatus 41 has an arm 43 which is provided on a supporting base 45 and grips the base material and lifts up/down in vertical direction. Further, a pair of melting baths 47a, 47b fixed to each other are provided slidably on the supporting base 45 in a single direction. Lids 49a, 49b are provided for covering the top of the melting baths 47a, 47b. Below the lids 49a, 49b, narrow rectangular windows 51a, 51b are formed at end portions of the melting baths 47a, 47b. The windows 51a, 51b are open upward. The sliding direction of the melting baths 47a, 47b are determined so that when a base material 53 is lifted down by operating the arm 43, the base material can be inserted into either the melting baths 47a or 47b through the windows 51a, 51b by shifting the melting baths 47a, 47b.

Moreover, an vibrator 55 extending horizontally to supply the elastic wave like ultrasonic wave are provided on the supporting base 45 so that they can be slid perpendicular to the sliding direction of the melting baths 47a, 47b. When the melting bath 47a is disposed at a position in which the base material 53 on the arm 43 can be inserted into the melting bath 47a, the vibrator 55 is positioned so that an end of the vibrator 55 is inserted from a side opening of the melting bath 47a to over the molten solder and the base material 53 lifted down is located near the end of the vibrator 55. The melting baths 47a, 47b have rotary vanes 57a, 57b. By rotating the rotary vanes 57a, 57b, jet stream is produced in the molten solder in the melting baths 47a, 47b so that the jet stream strikes the end of the vibrator 55 and the base material 53 lifted down. The melting baths 47a, 47b have each conduit pipe for supplying inactive gas and outlets 59 of the conduit pipes are disposed on upper section of a side wall of the melting bath 47a so that the inactive gas supplied from the conduit pipe covers the surface of the molten solder and surrounding of the jet stream of the molten solder. The supporting base 45 contains a controller 61 for controlling the operation and positions of the melting baths 47a, 47b, a flow meter 63 for controlling a supply amount of the inactive gas, and an oscillator 65 for controlling the elastic wave supplied from the vibrator 55.

In the above described structure, the melting bath 47a is positioned just below the arm and solder is charged on the melting baths 47a, 47b and melted by heat while the inactive gas is supplied to the melting baths 47a, 47b.

The rotary vane 57a is rotated so as to produce jet stream and the elastic wave is generated by the vibrator 55. The base metal 53 is gripped by the arm 43 and lifted down so as to come into contact with the jet stream of the molten solder. Then, the base metal 53 located near the vibrator 55 with a slight distance is attracted toward the vibrator 55 due to an influence of the elastic wave and comes into contact with the vibrator 55. As a result, the elastic wave is supplied directly to the base material 53 so that the wettability of the molten solder is improved. After that, the arm 43 is lifted up so as to release the base material 53 from the molten solder. If solder for use in soldering is changed to another solder, the melting baths 47a, 47b are slid so that the melting bath 47b is positioned just below the arm 43. Then, the rotary vane 57a is stopped and the rotary vane 57b is started, and the same procedure as described above is repeated.

The soldering apparatus 41 having two melting baths is capable of omitting a time for replacing the solder in soldering process. This apparatus is effective especially in a case when two kinds of solders are to be applied to the base material on a single piece.

In the aforementioned soldering apparatus 41, it is permissible to fix the melting baths 47a, 47b such that the arm 43 and vibrator 55 are movable horizontally on the supporting base 45. It is also permissible to dispose a pair of the vibrators on each melting bath so that only the horizontal position of the arm can be changed.

The aforementioned soldering apparatus is suitable for soldering or plating a relatively wide area with the base material being dipped in the melting solder, however, a soldering apparatus which injects solder through a nozzle is suitable for soldering fine portions for wiring formation and semiconductor mounting or the like. An example of a nozzle type apparatus will be described below.

Figure 6:
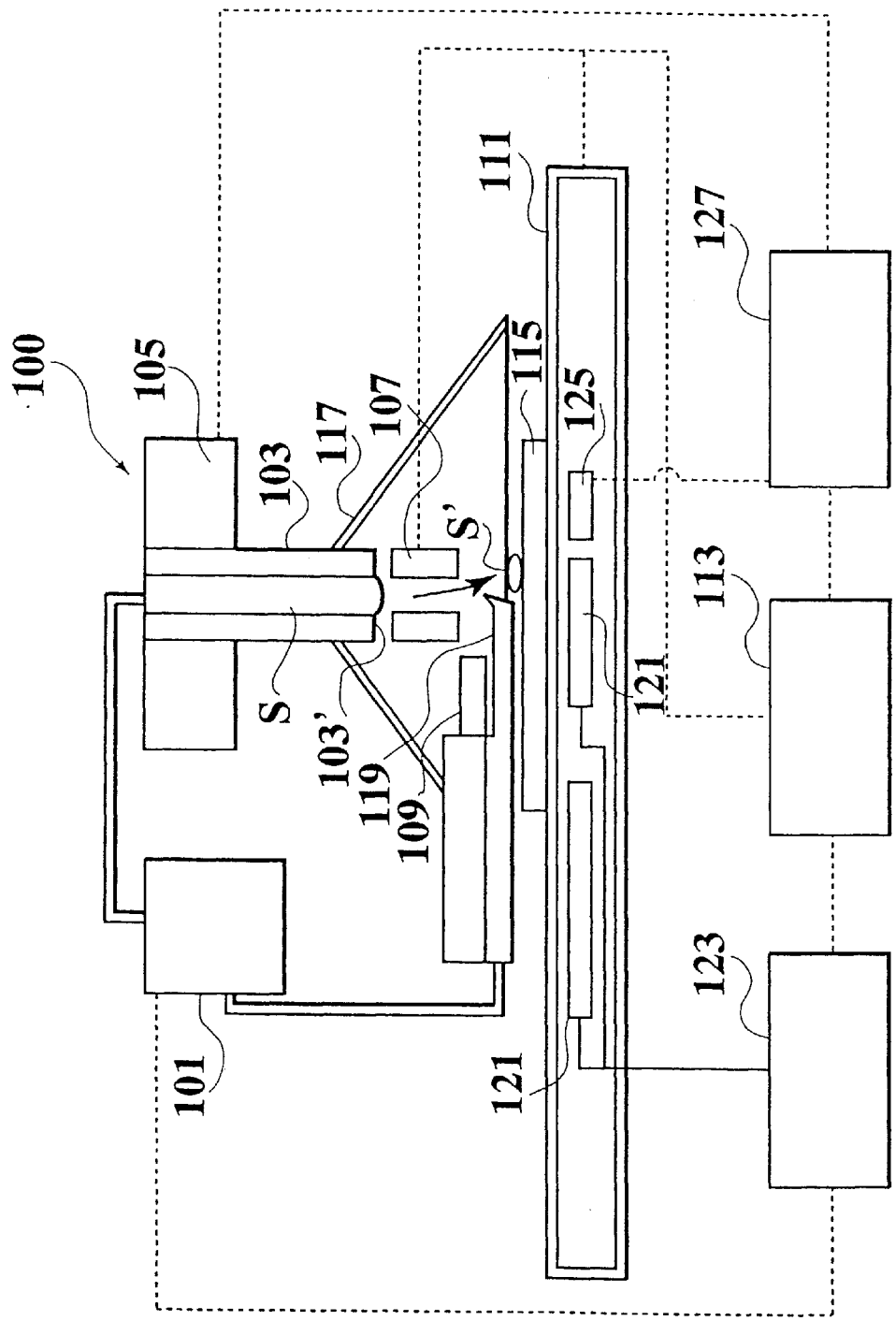
FIG. 6 is a schematic structure diagram showing the fifth embodiment of the apparatus for practicing the soldering method according to the present invention.

FIG. 6 shows an example of a nozzle type soldering apparatus according to the present invention. This soldering apparatus 100 comprises a melting bath 101 for heating and melting the solder, a nozzle 103 connected to the melting bath 101 and having a heating device (omitted from the drawing), an oscillating unit 105 attached to the nozzle 103, an electric field generation unit 107 disposed along the injecting direction of the nozzle 103 and having electric field plates, a gas supplying unit 109 for supplying inactive gas and a transfer unit 111. The solder is thrown into the melting bath and melted by heating. After that, the melted solder is supplied to the nozzle 103 at a constant speed. Elastic wave oscillated from the oscillating unit 105 is transmitted to the melted solder S in the nozzle 103. Consequently, the solder S is made to droplet S' and regularly discharged from the nozzle port 103' of the nozzle 103. The droplet S' discharged from the nozzle 103 is charged by the electric field plate of the electric field generation unit 107 and proceeds in the electric field generated by the electric field generation unit 107. The electric field which is generated by the electric field generation unit 107 is controlled by a controller 113 and the track of the droplet S' changes thereby. The droplet S' reaches the substrate 115 which is a base material placed on the transfer unit 111. The nozzle 103 is provided with a hood 117 for preventing oxidation of the droplet S' by inactive gas supplied from the gas supplying unit 109. The electric field generation unit 107 is connected to the controller 113 and the controller 113 has a positioning control function for controlling the transfer speed of the transfer unit 111 and the electric field generated by the electric field generation unit 107 so that the droplet S' reaches an appropriate position on the substrate 115. Moreover, a vessel 119 is provided for recovering the droplets which are made not to reach the substrate 115, and the recovered solder is transfered to the melting bath 101 via a circulator (omitted from the drawing). The transfer unit 111 has a heating/cooling unit 121, and the temperatures of the melting bath 101, the heating/cooling unit 121 and nozle 103 are controlled by a temperature controller 123. Moreover, the transfer unit 111 has an oscillator 125 for supplying elastic wave to the substrate 115. The wave length of the elastic wave transmitted by each of the oscillator 125 and the oscillating unit 105 is controlled by a frequency adjusting unit 127.

In the above apparatus, the oscillating unit 105 is used as a means for discharging solder, and it may be substituted by known means with spark or bubbles which is used in ink jet technology.

An example of injecting, for example, solder in which, in terms of composition ratio, tin is at least 90.9 wt %, zinc is 9 wt %, other metallic element content is less than 0.1 wt % and oxygen content is less than 5 ppm (eutectic point: 198° C.) by using the aforementioned soldering unit 100 will be described below.

First, the solder is thrown into the melting bath 101 and nitrogen gas is supplied from the gas supplying unit 109 to the vicinity of the nozzle 103 as inactive gas, while the solder in the melting bath 101 is held at 208° C. so as to be melted completely. The melted solder is sent to the nozzle 103 and elastic wave output is supplied from the oscillating unit 105 to the melted solder S. As a result, fine solder droplets S' are discharged from the nozzle 103. If the electric field generated by the electric field generation unit 107 is fixed, the solder droplets S' reach a predetermined position on the substrate 115, so that the solder droplets S' are stacked and hardened, thereby gradually increasing the thickness of solder on the substrate 115. With this condition, if the transfer unit 111 is moved horizontally at a constant speed, spots or a line is formed by solder particles on the substrate. By supplying elastic wave to the substrate 115 by the oscillator 125, when the solder droplet S' comes into contact with the substrate 115, the oxide membrane on the surface of the substrate 115 is diffused so that the wettability is improved.

By the soldering operation using the aforementioned nozzle, soldering in spots of 5 $\mu$m to 50 $\mu$m in diameter or soldering in line of the same width is made possible.

A heating/cooling unit 121 of the transfer unit 111 is used to control hardening of the solder on the substrate and can be used to increase the thickness of the applied solder. For example, if the temperature of the substrate is lowered below the eutectic point of the solder, the solder droplet reaching the surface of the substrate begins to be hardened. If this substrate is reheated over the eutectic point, the hardened solder begins to be melted again so that semi-melted condition in which liquid phase and solid phase are mixed is made. The surface tension of the solder in this condition is larger than that of the completely melted solder. Therefore, even if another solder droplet is added to the solder in the semi-melted condition, it does not extend horizontally but it is integrated with the semi-melted solder so that it is hardened. As a result, solder film having a sufficient thickness is obtained. Thus, the location and the temperature of the heating/cooling unit 121 of the transfer unit 111 are determined so that the additional solder droplet can be appropriately applied to the solder in the semi-melted condition on the substrate 115. As a result, by stacking the solder spots by means of a plurality of the nozzles, thick soldering film is formed.

Figure 7:
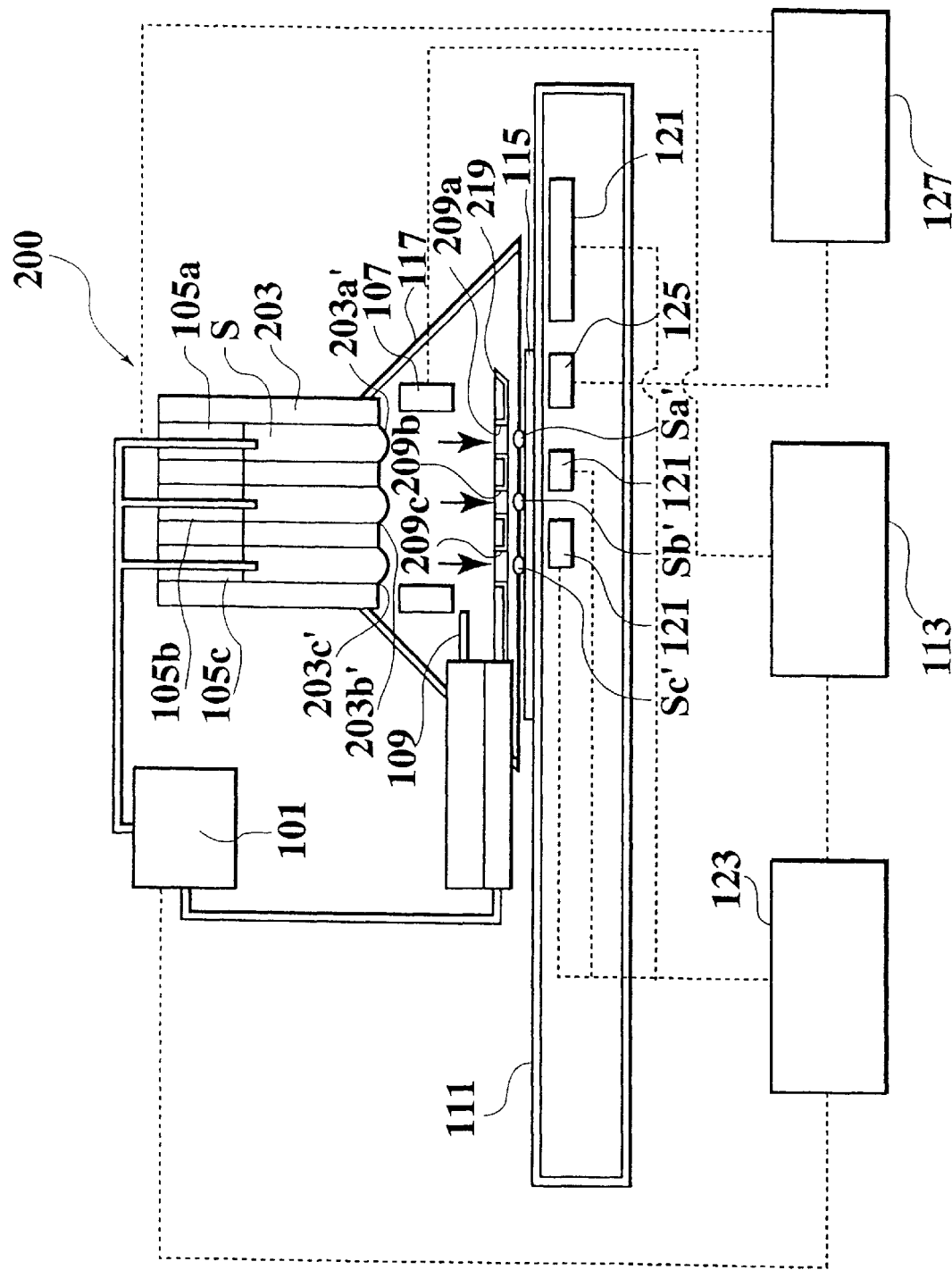
FIG. 7 is a schematic structure diagram showing the sixth embodiment of the apparatus for practicing the soldering method according to the present invention.

A soldering apparatus 200 shown in FIG. 7 comprises a nozzle 203 having a plurality of nozzle ports 203a', 203b' and 203c'. Solder droplets 5a', 5b' and 5c' are discharged from the respective nozzle ports by oscillating devices 105a, 105b, and 105c and reach the substrate 115 through passing ports 209a, 209b, 209c which are provided on the vessel 219 for recovering the solder. Solder droplets which do not pass the passing ports 209a, 209b, 209c by the the effect of the electric field generated by the elctric field generation unit 107 are recovered by the vessel 219 and return to the melting bath 101. Parts having the same reference numerals as in FIG. 6 perform the same action as corresponding parts of the slodering unit 100, thus description thereof is omitted.

The soldering method mentioned in the present invention can be executed by using a nozzle unit in which vibration energy is supplied from the nozzle itself to a base material to be soldered. For example, the following nozzle unit is available. An elastic wave oscillator is provided in the vicinity of a nozzle being communicated to a melting bath in which solder is melted in non-oxidizing environment and the nozzle is sheathed so that the nozzle tip is covered with non-oxidizing gas environment and non-oxidizing gas such as nitrogen flows in the sheath. While supplying non-oxidizing gas to the nozzle tip of such a nozzle unit, the nozzle is approached to the base material to be soldered, and the nozzle tip is then made into contact with the base material. While putting the melted solder supplied from the melting bath to the nozzle tip into contact with the base material, vibration energy is applied to the nozzle. After that, the nozzle is taken away from the base material while a predetermined amount of the solder is pushed out from the nozzle tip. With this operation, soldering in fine parts can be achieved. It is permissible to keep the nozzle tip slightly away from the base material and supply vibration energy only when the melted solder is kept in contact with the base material. If the nozzle is moved while the melted solder is pushed out continuously, linear soldering can be carried out.

If the oscillatory wave energy is applied to a substrate which is erected with a slight inclination and if non-oxidizing gas is spouted through the aforementioned nozzle so as to discharge the molten solder over the substrate, the wiring of the substrate is wetted by the solder. Excess amount of the solder flows off the substrate and it is then recovered.

According to a further embodiment, it is possible to configure a soldering apparatus for soldering with a mask.

In this case, the soldering apparatus comprises, for example, a solder supplying member for supplying the molten solder in the form of a plane by exuding the molten solder from a flat plate having a plurality of small discharge holes, an elastic wave generator provided on the flat plate, an inactive gas supply pipe and a mask. In a soldering apparatus of this kind, the mask is positioned and overlaid with the base material, the solder supplying member is brought into contact with the mask while the atmosphere is substituted by inactive gas, the molten solder is brought into contact with the base material through the holes of the mask and oscillatory wave energy is applied so that the solder adheres to the base material. Then, the solder supplying member and mask are removed from the base material.

Figure 8:
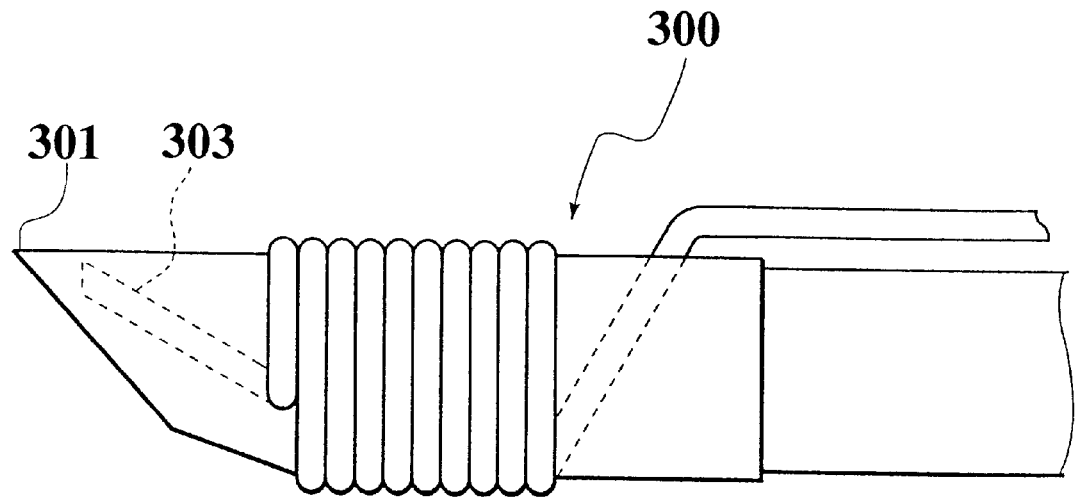
FIG. 8 is a schematic structure diagram showing the seventh embodiment of the apparatus for practicing the soldering method according to the present invention.

The solid solder is more difficult to be oxidized as compared to the molten solder and the present invention is applicable for soldering with the solid solder particles. For example, if the solid solder particles are made into a firm contact with the base material so as to achieve a face contact between the solder particles and base material, there is no atmosphere therebetween so that the contact interface is substantially non-oxidizing environment. If the oscillatory wave energy is applied to the solder particles while the solder particles are melted by heat, the wettability of the molten solder to the base material becomes relatively excellent. If the base material is cooled after that, the soldering is completed. The soldering procedure with such solder particles can be carried out using a soldering iron as shown in FIG. 8. This soldering iron 300 has an iron member 301 containing a heater for heating the solder and a ultrasonic wave oscillator 303 contained in the iron member 301. The ultrasonic wave oscillator 303 is disposed in the vicinity of a heating surface of the iron member 301 and supplies oscillatory wave energy effectively to the molten solder. A distance between the heating surface of the iron member 301 and the oscillation position of the ultrasonic wave oscillator 303 is preferred to be 1 to 10 mm. The oscillatory wave energy is transmitted to the surface of the base material through the solder melted by heating of the iron member 301. Further, a temperature sensor (not shown) is contained in the iron member 301 and connected to a temperature controller and ultrasonic wave adjuster.

The soldering iron shown in FIG. 8 is capable of being used as a soldering arm for soldering step in the non-oxidizing environment of an automatic apparatus.

Figure 9:
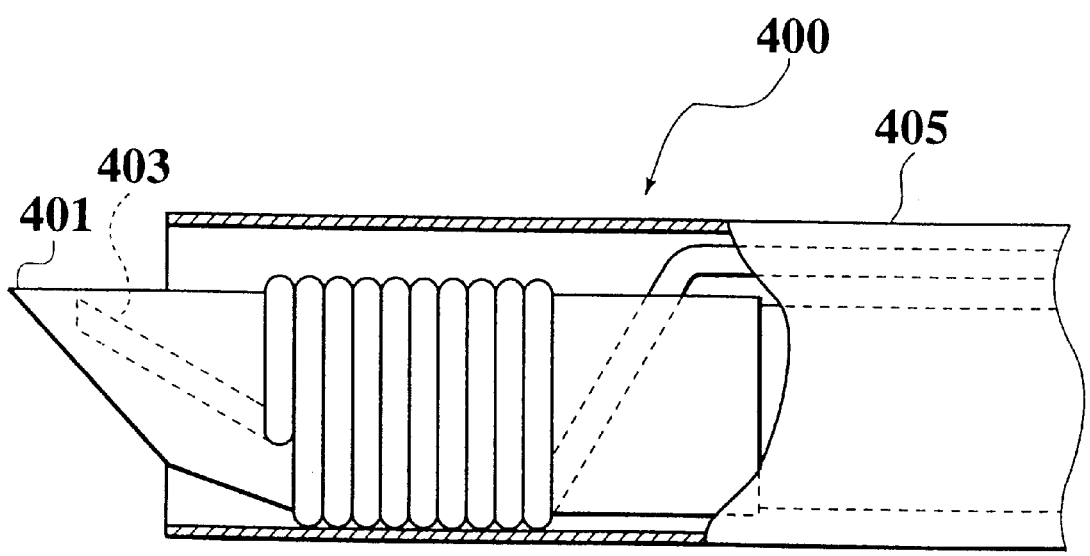
FIG. 9 is a schematic structure diagram showing the eighth embodiment of the apparatus for practicing the soldering method according to the present invention.

FIG. 9 shows another soldering iron. The soldering iron 400 has a gas supply pipe 405 for covering an iron member 401 and a contained ultrasonic wave oscillator 403. To keep the environment for melting the solder by heat in the non-oxidizing condition, inactive gas is supplied from the gas supply pipe 405 to the surrounding of a heating surface of the soldering iron 401.

The soldering irons 300, 400 shown in FIGS. 8 and 9 can be used not only in manual soldering operation and automatic operation by the automatic apparatus, but also for correcting incomplete solder bond and the like. Further, the soldering irons 300, 400 can preferably be used for soldering using solder paste in which flux is mixed with solder material. In this case, after the flux is removed by heating the solder paste in advance, the solder is heated through a soldering iron and at the same time, oscillatory wave energy is supplied. If the soldering iron 400 of FIG. 9 is used, it is possible to heat the solder paste in advance by heating the active gas supplied from a gas supply pipe 405.

Figure 10:
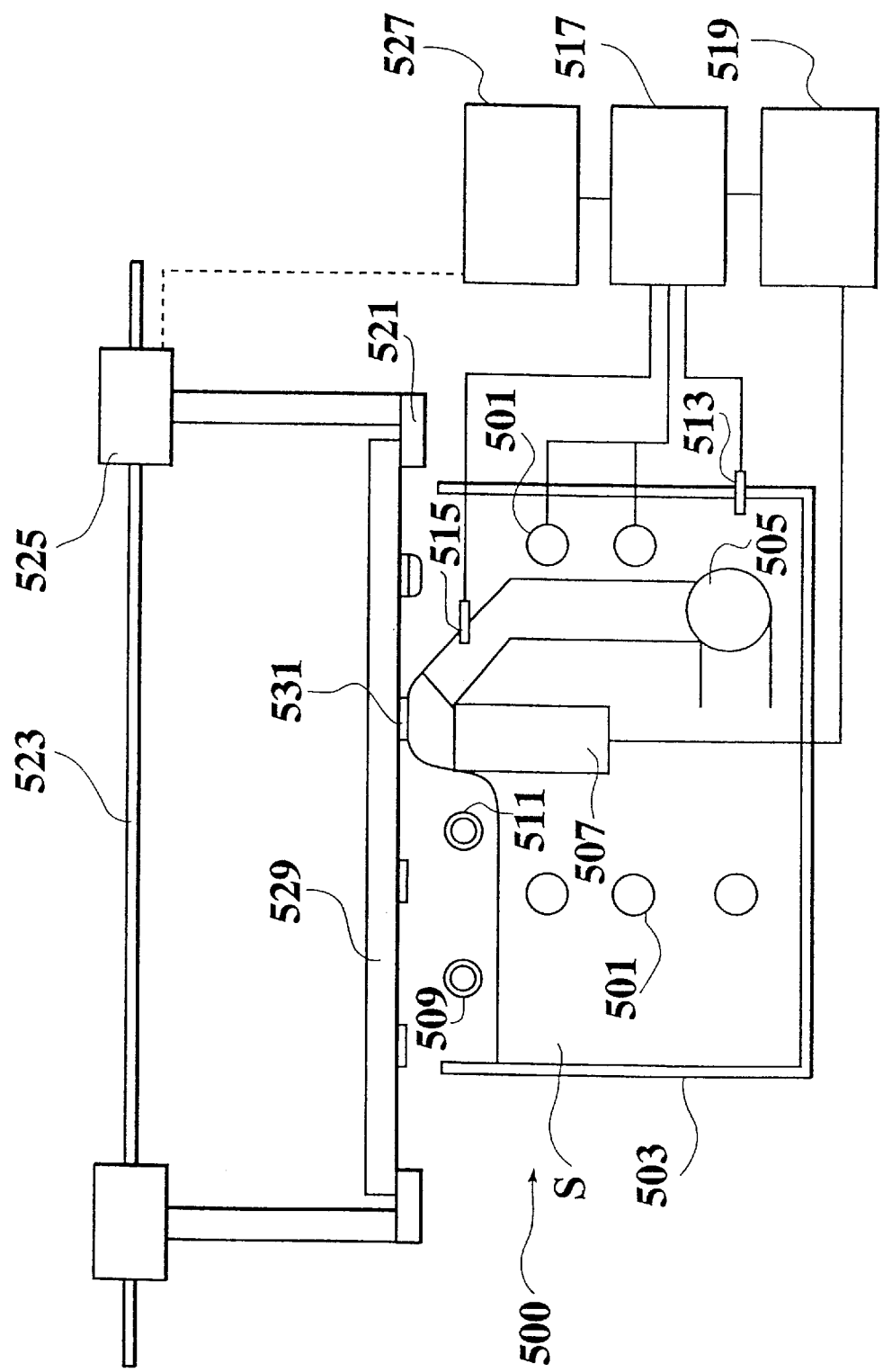
FIG. 10 is a schematic structure diagram showing the ninth embodiment of the apparatus for practicing the soldering method according to the present invention.

FIG. 10 shows an example of a soldering apparatus so constructed to circulate and recover the inactive gas to be supplied to make a soldering work area in the inactive gas environment. This soldering apparatus 500 comprises a melting bath 503 having a heater 501 for melting solder, a pump 505 for circulating the molten solder S, a vibrator 507 for supplying elastic wave to the solder S sent from a pump 505 disposed near the surface of the molten solder, a gas supply pipe 509 and a gas suction pipe 511. The solder S melted by the heater 501 is spouted above the vibrator 507 by an output of the pump 505. By locating the base material above the vibrator 507, the spouted solder S comes into contact with the base material so that the elastic wave is transmitted from the vibrator 507 to the base material through the solder S. The atmospheric air over the surface of the solder S is substituted with an inactive gas such as nitrogen discharged from the gas supply pipe 509 so as to suppress oxidation of the surface of the solder S and base material. The atmospheric air substituted with the inactive gas is discharged through the gas suction pipe 511 in order to prevent a rise of the oxygen content due to mixing of oxygen outside and for recycle. The gas suction pipe 511 is connected to an oxygen removing apparatus (not shown). Further, sensors 513, 515 for detecting the temperature of the solder spouted toward the solder in the melting bath and base material are provided and connected to a temperature controller 517 for controlling the heating temperature of the heater 501 according to the detected temperature. The frequency of the elastic wave outputted from the vibrator is controlled by a vibration frequency adjuster 519. Over the melting bath 503 are provided a rack 521 for carrying the base material and a variable speed traveling device 525 for moving the rack 521 along a rail 523. The variable speed traveling device 525 is controlled by a controller 527 so as to appropriately control a traveling speed and height of the rack 521.

A printed circuit board 529 having a pad 531 is mounted on the rack 521 of the apparatus shown in FIG. 10 with the pad 531 facing down and carried up to over the melting bath 503 by the variable speed traveling device 525 along the rail 523. When the pad 531 is positioned over the vibrator 507, the molten solder S spouted from the pump 505 makes contact with the pad 531. At the same time, the elastic wave supplied from the vibrator 507 is transmitted to the pad through the molten solder S. The environment is made non-oxidizing by the inactive gas supplied from the gas supply pipe 509, so that soldering of the pad is carried out favorably. The printed circuit board 529 in which soldering of the pad is completed is removed from the melting bath 503. The environment in which oxygen is mixed by a traveling of the printed circuit board is always removed by the gas suction pipe 511 and kept in the non-oxidizing environment. In the above manner, the pad of the printed circuit board made of glass epoxy medium is soldered as a base material. In this case, it is preferable to so construct the soldering apparatus such that transportation of the substrate is adjusted so as not to open the top section of the melting bath except when absolutely necessary or a closing lid is provided for covering the melting bath. It is permissible to keep the non-oxidizing environment by adjusting the supply speed of the inactive gas in the gas supply pipe 509.

Hereinafter, the present invention will be described further in detail with reference to the examples.

EXAMPLES

Example 1

The apparatus of FIG. 1 was used. Solder of 80 kg, having tin of more than 90.9 wt %, zinc of 9 wt %, other metallic components of less than 0.1 wt % and oxygen content of 7 ppm in terms of composition ratio was charged in the melting bath 5 and heated at 208° C. which is 10° C. higher than its theoretical eutectic point of 198° C. so that the solder was melted completely. In this operation, at the time when the temperature reached 190° C., nitrogen was fed as inactive gas to the environment over the surface of the molten solder and it was continued so as to prevent the solder from contacting oxygen. The solder was melted an hour after heating was started and the temperature was kept at 208° C.

An output of the oscillatory wave having the frequency of 18.82 kHz was supplied into the melting bath from the oscillator 7 provided on the melting bath. At this time, it was confirmed that in an area 10 cm long and 1 cm wide, the molten solder surface was swollen by about 1 cm in height. A ⅔ portion of a copper piece of 50 mm x 10 mm x 0.5 mm in size, not subjected to finish treatment was dipped in the molten solder at a position within 2 mm from a vibrator of the oscillator 7 for a second and then raised.

The raised copper piece was left to cool and then observed with a magnifier. As a result, the thickness of the solder was 14 μm and wetting angle was less than 90 degrees. It was found that there was no problem in the soldering performance.

Comparative Example 1

The same procedure as for the Example 1 was executed except that the oscillatory wave output was not applied from the oscillator 7. The wettability of solder to a copper piece was observed. Wetting of solder to the copper piece was not noticed by visual check.

On the other hand, after the surface of the copper was washed by hydrochloric acid and pure water, the copper piece was dipped in the molten solder without being exposed to the atmosphere. Like the above case, the soldering procedure was executed without applying the oscillatory wave output. As a result, the solder adhered to the copper piece.

Comparative Example 2

The same operation as for the Example 1 was carried out except that the procedure was carried out in the atmospheric environment without supplying nitrogen gas into the melting bath 5. Thin solder films formed on the surface of the molten solder adhered to the copper piece so that plural folds were formed on the solder and excessive solder trailed down from an end of the copper piece. When the solder was scratched after cooling, the solder was peeled from the copper piece.

Example 2

The apparatus of FIG. 1 was used. Solder of 60 kg, having tin of more than 90.9 wt %, zinc of 9 wt %, other metallic components of less than 0.1 wt % and oxygen content of 7 ppm in terms of composition ratio was charged in the melting bath 5 having a volume of 10 L and heated at 220° C. which is about 20° C. higher than its theoretical eutectic point of 198° C. so that the solder was melted completely. In this operation, at the time when the solder began to be partially melted, nitrogen was fed as inactive gas to the environment over the surface of the molten solder and it was continued so as to prevent the solder from contacting oxygen. The solder was melted an hour after heating was started and the temperature was kept as it was. An oxygen concentration of the environment over the molten solder was measured. The measured concentration was 120 to 160 ppm.

With this condition, the output frequency of the oscillator 7 provided in the melting bath was adjusted to 18.83 kHz and the elastic wave output was supplied as oscillatory wave energy into the melting bath. At this time, it was found that in an area of 10 cm long and 1 cm wide, the molten solder surface was swollen by about 1 cm in height. A substrate for electronic part mounting mentioned below was dipped in the molten solder at a position within 2 mm from the vibrator of the oscillator 7 for 2.0 seconds and then raised.

Specification of the substrate dimensions: 50 mm×50 mm×1.0 mm material: glass epoxy resin finish treatment: through hole, double-sided flash plating, solder resist treatment Specification of wiring wiring: laminated wiring of copper 18 µm/nickel 5 µm/gold 0.05 µm wire width: 200 µm minimum pitch interval: 400 µm The raised substrate was cooled and then observed with a magnifier. Solder adheres to any place of the wire and no bridge of solder was found between the wires.

To research the detail, the substrate was cut and its cross section was observed to check the wettability of the solder on the wire. As a result, the wetting angle was less than 90 degrees, there was no problem in soldering performance. The thickness of the solder was about 15 µm.

Example 3

The apparatus of FIG. 1 was used. Solder of 80 kg, having tin of more than 96.4 wt %, silver of 3.5 wt %, other metallic components of less than 0.1 wt % and oxygen content of 8 ppm in terms of composition ratio was charged in the melting bath 5 and heated at 231° C. which is 10° C. higher than its theoretical eutectic point of 221° C. so that the solder was melted completely. In this operation, at the time when the temperature reached 220° C., nitrogen was fed as inactive gas to the environment over the surface of the molten solder and it was continued so as to prevent the solder from contacting oxygen. The solder was melted an our after the heating was started and the temperature was kept at 231° C.

The oscillatory wave output having the frequency of 18.82 kHz was supplied from the oscillator 7 provided in the melting bath into the melting bath. At this time, it was found that in an area of 10 cm long and 1 cm wide, the molten solder surface was swollen by about 1 cm in height. A ⅔ portion of a copper piece of 50 mm×50 mm×0.3 mm, not subjected to finish treatment was dipped in the molten solder at a position within 2 mm from the vibrator of the oscillator 7 for a second and then raised.

The raised copper piece was left to cool and observed with a magnifier. As a result, it was found that solder adhered uniformly to the dipped portion. To reseach the detail, the copper piece was cut and its cross section was observed. The wetting angle of the solder was less than 90 degrees and there was no problem in soldering performance.

Example 4

The soldering apparatus of FIG. 3 was used. Solder of 80 kg, having tin of more than 41.9 wt %, bismuth of 55 wt %, other metallic components of less than 0.1 wt % and oxygen content of 4 ppm in terms of composition ratio was charged in the melting bath 5 having a volume of 10 L and heated at 149° C. which is 10° C. higher than its theoretical eutectic point of 139° C. so that the solder was melted completely. In this operation, at the time when the solder began to be partially melted, nitrogen gas was fed as inactive gas to an environment over the surface of the molten solder and it was continued so as to prevent the solder from contacting oxygen. The solder was melted an hour after the heating was started and the temperature was kept as it was.

The oscillatory wave output having the frequency of 18.52 kHz was supplied in the melting bath from the oscillator 33 provided in the melting bath. A copper piece of 50 mm×50 mm'0.3 mm not subjected to finish treatment was inserted in the gap 35 of the oscillator 33, and a ⅔ portion of the copper piece was dipped in the molten solder for 2.0 seconds and then raised.

The raised copper piece was left to cool and observed with a magnifier. To research the detail, the copper piece was cut and its cross section was observed. The wetting angle of the solder was less than 90 degrees and there was no problem in soldering performance.

Example 5

The soldering apparatus of FIG. 1 was used. Solder of 80 kg, having tin of 90.9 wt %, zinc of 9 wt %, other metallic components of less than 0.1 wt % and oxygen content of 7 ppm in terms of composition ratio was charged in the melting bath 5 having a volume of 10 L and heated at 220° C. which was about 20° C. than its theoretical eutectic point of 198° C. so that the solder was melted completely. In this operation, at the time when the solder began to be partially melted, nitrogen was fed as inactive gas to an environment over the surface of the molten solder and it was continued so as to prevent the solder from contacting oxygen. The solder was melted about an hour after the heating was started and the temperature was kept as it was.

The oscillatory wave output having the frequency of 18.52 kHz was supplied in the melting bath from the oscillator 7 provided in the melting bath. At this time, it was found that in an area of 10 cm long and 1 cm wide, its molten solder surface was swollen by about 1 cm in height. A ⅔ portion of a copper piece of 50 mm×10 mm×0.3 mm, not subjected to finish treatment was dipped in the molten solder at a position within 2 mm from the vibrator of the oscillator 7 for two seconds and then raised.

The raised copper piece was cooled and observed with a magnifier. As a result, it was found that the solder adhered uniformly to the dipped portion. To reseach the detail, the copper piece was cut and its cross section was observed. The wetting angle of the solder was less than 90 degrees and there was no problem in soldering performance.

Example 6

The apparatus of FIG. 1 was used. Solder of 80 kg, having tin of more than 96.4 wt %, silver of 3.5 wt %, other metallic components of less than 0.1 wt % and oxygen content of 8 ppm in terms of composition ratio was charged in the melting bath 5 and heated at 231° C. which was 10° C. higher than its theoretical eutectic point of 221° C. so that the solder was melted completely. In this operation, at the time when the temperature reached 200° C., nitrogen was fed as inactive gas to the environment over the surface of the molten solder and it was continued so as to prevent the solder from contacting oxygen. The solder was melted an hour after the heating was started and the temperature was kept at 231° C.

With this condition, the frequency of the oscillator provided on the melting bath was adjusted to 18.52 kHz and the elastic wave output was supplied in the melting bath as oscillatory wave energy. At this time, it was found that in an area 10 cm long along the oscillation direction of the elastic wave, 1 cm wide, its molten solder surface was swollen by about 1 cm in height. A substrate for electronic part mounting mentioned below was dipped into the molten solder at a position within 2 mm from the vibrator and then raised.

Specification of the substrate
dimensions: 50 mm×50 mm×t1.0 mm
material: glass epoxy resin
finish treatment: through hole, double-sided flash plating, solder resist treatment
Specification of wiring
wire: laminated wire of copper 18 μm/nickel 5 μm/gold 0.05 μm
wire width: 200 μm
minimum pitch interval: 400 μm The raised substrate was cooled and observed with a magnifier. Solder adheres to any place of the wiring and no bridge of solder was found between the wires.

To research the detail, the substrate was cut and its cross section was observed so as to check the wettability of the solder. As a result, the wetting angle was less than 90 degrees and there was no problem in soldering performance.

Example 7

Solder having tin of more than 90.9 wt %, zinc of 9 wt %, oxygen content of less than 5 ppm and other metallic components of less than 0.1 wt % in terms of composition ratio was charged in the melting bath 101 of the soldering apparatus 100 of FIG. 6 and heated at 208° C. which was 10° C. higher than its theoretical eutectic point of 198° C. At the time when the temperature reached a temperature about 10° C. lower than the theoretical eutectic point, nitrogen was fed as inactive gas into an area surrounded by electric field plates of the electric field generating device 107 and it was then continued so as to prevent oxygen from existing in a hood 117. The solder was melted about an hour after the heating was started and the temperature was kept as it was.

The nozzle was heated at 208° C. and the elastic wave having the frequency of 15 kHz to 30 kHz was outputted from the oscillating unit 105 while the molten solder was being supplied to the nozzle 103 from the melting bath 101. As a result, it was confirmed that fine solder particles were discharged therefrom. At this time, the trace of solder particles was controlled by generating an electric field from the electric field generator 107, so that the solder particles were stacked at a specific position on a transfer unit 111.

A copper plate was placed on the transfer unit 111 and a bottom of the copper plate was heated by a heater 121 so that the surface of the copper plate reached about 180° C. while the oscillator 125 was actuated to output the elastic wave having the frequency of 18.52 kHz to the transfer unit 111. The transfer unit 111 was moved horizontally at a speed of 2 cm/second and passed below the nozzle.

After that, the copper plate was cooled and the solder on the copper plate was observed. As a result, it was found that solder spots about 25 μm in diameter were arranged in line. The copper plate on which the solders were placed was cut in a vertical direction and its cross section was observed. The wetting angle of the solder was less than 90 degrees and it was confirmed that the wettability of the solder was excellent.

Then, the traveling speed of the transfer unit 111 was reduced so that the copper plate was moved by 20 μm each time when a solder particle reached the copper plate.

After the copper plate was passed below the nozzle, it was cooled. As a result, belt-like solder having a width of 20 to 25 μm was observed on the copper plate. Solder thickness was about 10 μm. The copper plate was cut and its cross section was observed. The wetting angle between the solder face and copper plate was less than 90 degrees and it was confirmed that the wettability of the solder was excellent.

Example 8

Instead of the tin-zinc solder, other solder having such a composition that tin was more than 99.2 wt %, copper was 0.7 wt %, other metallic components were less than 0.1 wt % and oxygen content was 5 ppm was used and the heating temperature for the melting bath and nozzle was changed to 237° C. which was 10° C. higher than the theoretical eutectic point of 227° C. Further, the copper plate holding temperature was changed to 220° C. The same procedure as in Example 7 except the matters mentioned above was carried out so as to achieve spot-like and belt-like soldering on the copper plate.

The spot-like solder applied to the copper plate was observed. Its size was about 25 μm. The copper plate was cut in a vertical direction and its cross section was observed. As a result, the wetting angle between the solder and copper plate was less than 90 degrees and it was confirmed that the wettability with the solder was excellent.

In rgard to the belt-like solder, its width was 20 to 25 μm and the thickness was about 10 μm. The copper plate was cut and its cross section was observed. As a result, the wetting angle between the solder face and copper plate was less than 90 degrees and it was confirmed that the wettability of the solder was excellent.

Example 9

Instead of the tin-zinc solder, solder having such a composition that tin was more than 42.9 wt %, bismuth was 57 wt %, other metallic components were less than 0.1 wt % and oxygen content was 5 ppm was used and the heating temperature of the melting bath and nozzle was changed to 149° C. which was 10° C. higher than the theoretical eutectic point of 139° C. Moreover, instead of the copper plate, an aluminum plate of 50 mm×10 mm×0.3 mm was used and the aluminum holding temperature was changed to 130 C. The same procedure as in Example 7 except the matters mentioned above was carried out so as to make spot-like and belt-like soldering on the copper plate.

The spot-like solder applied to the aluminum plate was observed. Its size was about 25 μm. The aluminum plate was cut in a vertical direction and its cross section was observed. As a result, the wetting angle between the solder face and the aluminum plate was less than 90 degrees and it was confirmed that the wettability with the solder was excellent.

In regard to the belt-like solder, its width was 20 to 25 μm and its thickness was about 10 μm. The aluminum plate was cut and its cross section was observed. As a result, the wetting angle between the solder face and aluminum plate was less than 90 degree and it was confirmed that the wetting with the solder was excellent.

Example 10

Instead of the tin-zinc solder, solder having such a composition that tin was more than 96.4 wt %, silver was 3.5 wt %, other metallic components were less than 0.1 wt % and oxygen content was 5 ppm was used and the heating temperature of the melting bath and nozzle was changed to 231° C. which was 10° C. higher than the theoretical eutectic point of 221° C. The copper plate holding temperature was changed to 200° C. The same procedure as in Example 7 except the matters that the copper plate holding temperature was changed to 200° C. was carried out so as to make spot-like and belt-like soldering on the copper plate.

The spot-like solder applied to the copper plate was observed. Its size was about 25 μm. The copper plate was cut in a vertical direction and its cross section was observed. As a result, the wetting angle between the solder face and the copper plate was less than 90 degrees and it was confirmed that the wettability with the solder was excellent.

In the case of the belt-like solder, its width was 20 to 25 μm and its thickness was about 10 μm. The copper plate was cut and its cross section was observed. As a result, the wetting angle between the solder face and the copper plate was less than 90 degrees and it was confirmed that the wetting with the solder was excellent.

Example 11

The same procedure as in Example 1 was carried out, excepting that, instead of the copper plate, a stainless steel piece was dipped into the molten solder. Then, the wettability of the solder to the stainless steel piece was observed. As a result, the solder adhered uniformly to the stainless steel with its thickness of 14 μm. The wetting angle was less than 90 degrees and there was no problem in soldering performance.

Example 12

The apparatus having a structure of FIG. 1 was used.

Solder of 1 kg, having such a composition that tin was more than 48.4 wt %, indium was 51.5 wt %, other metallic components were less than 0.1 wt % and oxygen content was 7 ppm was charged in the melting bath 5 and heated at 127 C which was 10° C. higher than its theoretical eutectic point of 117° C. so that the solder was melted completely. In this operation, nitrogen was continued to be fed as inactive gas to an environment over the surface of the molten solder so as to prevent the solder from contacting oxygen. The solder was melted about 20 minutes after the heating was started and its temperature was kept at 127° C. The elastic wave output having the frequency of 18.82 kHz was supplied in the melting bath from the oscillator provided in the melting bath. A ⅔ portion of a copper piece of 50 mm×10 mm×0.5 mm not subjected to finish treatment was dipped in the molten solder at a position within 2 mm from the vibrator of the oscillator for a second and then raised.

The raised copper piece was left to cool and observed with a magnifier. The solder thickness was 13 μm and the wetting angle was less than 90 degrees. It was confirmed that there was no problem in soldering performance.

According to the present invention, the soldering temperature can be decreased to near a liquidus temperature of the solder, so that far lower temperatures can be used as the soldering temperature as compared to a conventional soldering temperature which was 40 to 50°C. higher than the liquidus temperature. Further, by improving the wettability of the solder to the base material, it is possible to achieve preferable soldering using a solder which is inferior in wettability and which contains no lead, and the solder not containing lead can be used for soldering a fine, complicatedly shaped portion as well. Therefore, as soldering material for various apparatuses and devices, the solder not containing lead can be used. Thus, the present invention is capable of reducing lead contained in waste products and further effective for recycle of the waste product. Therefore, the present invention is very effective for industries and protection of natural environment.

The binary alloy solder composed of substantially tin and zinc without using other additive component is advantageous in that there is no fear in changes of solder characteristics due to generation of ternary eutectic substance or intermetallic compound after soldering. In particular, if bithmus or indium is us as an additive, it becomes difficult to recover usably purified materials from the solder alloy for recycling use. Moreover, the alloy solder of tin and zinc containing no bithmus and no indium is quite preferable for bonding of electronic devices by the reason which is described below.

As there are many apparently widely different embodiments of the present invention that may be made without departing from the spirit and scope thereof, it is to be understood that the invention is not limited to the specific embodiments thereof, except as defined in the appended claims.

What is claimed is:

1. A method of soldering a base material, comprising the steps of:

preparing a binary solder essentially consisting of tin and a metal component which can form an eutectic alloy with tin and which is exclusive of lead, such that the content of inevitable metal impurities is 0.1% by weight or less and that the content of oxygen is 100 ppm or less;

melting the binary solder in a non-oxidizing environment to produce molten binary solder; and dispensing the molten binary solder to the base material in an atmosphere in which the oxygen content is 2,000 ppm or less, to solder the base material with the binary solder.

2. The soldering method of claim 1, wherein said metal component of the binary solder is selected from the group consisting of zinc, silver, bismuth, indium and copper, and the melting step comprises a heating step for heating the binary solder at a temperature which is on or above an eutectic point of the binary solder.

3. The soldering method of claim 1, wherein said metal component of the binary solder is zinc, the content of the tin in the binary solder is within-a range of 85 to 97% by weight, the content of the zinc in the binary solder is within a range of 3 to 15% by weight, and the melting step comprises a heating step for heating the binary solder at a temperature of 210 to 230° C.

4. The soldering method of claim 1, wherein the dispensing step comprises:

putting the molten binary solder into contact with the base material while oscillatory wave energy at a frequency of 15 KHz to 1 MHz is provided to the base material.

5. The soldering method of claim 4, wherein the oscillatory wave energy is provided indirectly from an oscilator via the molten binary solder to the base material.

6. The soldering method of claim 1, wherein the base material is an electrically conductive member which is formed on a substrate being composed of a resin or a ceramic.

7. The soldering method of claim 6, wherein the electrically conductive member is a wire or a pad.

8. The soldering method of claim 1, wherein the base material is an electronic part which is to be mounted on a substrate of a semiconductor device.

9. A method of soldering a base material, comprising the steps of;

preparing a binary solder essentially consisting of tin and a metal component which can form an eutectic alloy with tin and which is exclusive of lead, such that the content of inevitable metal impurities is 0.1% by weight or less and that the content of oxygen is 100 ppm or less;

melting the binary solder in a non-oxidizing environment to produce molten binary soldier; and dispensing the molten binary solder to the base material in an atmosphere in which the oxygen content is 2,000 ppm or less, to solder the base material with the binary solder, wherein the molten binary solder is put in contact with the base material while oscillatory wave energy is provided indirectly from an oscillator via the molten binary solder to the base material.

* * * * *